United States Patent
Radford

(10) Patent No.: US 9,806,543 B2
(45) Date of Patent: Oct. 31, 2017

(54) SYSTEM AND METHODS TO CONFIGURE SERVICE PROVIDERS FOR CLIENT APPLIANCES, AND FOR TRACKING AND PROVIDING SERVICE DATA

(71) Applicant: David J. Radford, Los Altos Hills, CA (US)

(72) Inventor: David J. Radford, Los Altos Hills, CA (US)

( * ) Notice: Subject to any disclaimer, the term of this patent is extended or adjusted under 35 U.S.C. 154(b) by 801 days.

(21) Appl. No.: 14/099,880

(22) Filed: Dec. 6, 2013

(65) Prior Publication Data
US 2015/0163093 A1    Jun. 11, 2015

(51) Int. Cl.
H02J 7/00    (2006.01)
(52) U.S. Cl.
CPC .......... *H02J 7/0009* (2013.01); *H02J 7/0004* (2013.01)
(58) Field of Classification Search
USPC .................................................. 320/106, 109
See application file for complete search history.

(56) References Cited

U.S. PATENT DOCUMENTS

| | | | | |
|---|---|---|---|---|
| 2008/0122297 | A1* | 5/2008 | Arai ...................... | G06Q 50/06 307/154 |
| 2010/0076825 | A1* | 3/2010 | Sato .......................... | B60L 3/12 705/14.1 |
| 2010/0114798 | A1* | 5/2010 | Sirton .................. | B60L 11/1816 705/412 |
| 2012/0086395 | A1  | 4/2012 | Kim et al. | |

FOREIGN PATENT DOCUMENTS

| | | |
|---|---|---|
| KR | 10-2013-0081873 | 7/2013 |
| KR | 10-2013-0087779 | 8/2013 |
| WO | 2013099229 A2 | 7/2013 |
| WO | 2013/165597 A1 | 11/2013 |

OTHER PUBLICATIONS

"Hyperion EOS 0403i User's Manual", http://media.hyperion.hk/dn/eos, Nov. 2008 (6 pages).
"Hyperion EOS0606i-B User's Manual", http://media.hyperion.hk/dn/eos, Feb. 2009 (8 pages).
"Hyperion AC/DC EOS0606iAD-A User's Manual", http://media.hyperion.hk/dn/eos, Nov. 2008 (7 pages).
"Hyperion AC/DC EOS0606iAD-B User's Manual", http://media.hyperion.hk/dn/eos, Feb. 2009 (8 pages).
"Hyperion EOS 0606i AC/DC—User's Manual", http://media.hyperion.hk/dn/eos, Oct. 2007 (7 pages).
"Hyperion EOS 0606i User's Manual", http://media.hyperion.hk/dn/eos, Dec. 2007 (7 pages).

(Continued)

*Primary Examiner* — Samuel Berhanu
(74) *Attorney, Agent, or Firm* — Innovation Counsel LLP

(57) ABSTRACT

A system and methods to configure, track and provide device data for clients is disclosed. The system configures a device to interact according to client specified settings. The system also tracks relevant data from a service provider interaction with the client. The system is configured to provide the tracked data to a third party upon a validated request. For example, the system may store and provide the tracked data in the cloud, through a network.

24 Claims, 14 Drawing Sheets

(56) References Cited

OTHER PUBLICATIONS

"Hyperion EOS0610iDUOII Charger—User's Manual", http://media.hyperion.hk/dn/eos, Nov. 2008 (18 pages).
"Hyperion EOS-0610iDUO Charger—User's Manual", http://media.hyperion.hk/dn/eos, Dec. 2007 (16 pages).
"Hyperion EOS0720iNET Charger—User's Manual", http://media.hyperion.hk/dn/eos Nov. 2008 (17 pages).
Hyperion NET & DUO Series 3 Chargers—User Manual http://media.hyperion.hk/dn/eos, Dec. 2011(19 pages).
"Hyperion EOS-0610iNET Charger—User's Manual", http://media.hyperion.hk/dn/eos, Oct. 2007 (15 pages).
Lorex Baby, Care 'n' Share "3.5" Video Baby Monitor" Nov. 2013, http://www.lorextechnology.com/support/self-serve/Lorex-Stratus-Connectivity/5600032, Lorex Technology Inc. (3 pages).
Lorex Baby, Care 'n' Share "4.3" Video Baby Monitor" Nov. 2013, http://www.lorextechnology.com/support/self-serve/Lorex-Stratus-Connectivity/5600032, Lorex Technology Inc. (3 pages).
Lorex Baby, Care 'n' Share "Quick Start Guide", Nov. 2013, http://www.lorextechnology.com/support/self-serve/Lorex-Stratus-Connectivity/5600032, Lorex Technology Inc. (1 page).
Lorex, Live SD7+, LW2730 Series "Wireless Video Monitoring System", Nov. 2013, http://www.lorextechnology.com/support/self-serve/Lorex-Stratus-Connectivity/5600032, Lorex Technology Inc. (3 pages).
Lorex, Live SD7+, LW2730 Series "Wireless Video Monitoring System, Quick Start Guide", 2012, http://www.lorextechnology.com/support/self-serve/Lorex-Stratus-Connectivity/5600032, Lorex Technology Inc. (2 pages).
International Search Report, Application No. PCT/S2013/073923 dated Sep. 15, 2014.
Written Opinion, Application No. PCT/S2013/073923 dated Sep. 15, 2014.

* cited by examiner

SYSTEM AND METHODS TO CONFIGURE SERVICE PROVIDERS FOR CLIENT APPLIANCES, AND FOR TRACKING AND PROVIDING SERVICE DATA

FIELD OF THE DESCRIBED EMBODIMENTS

The described embodiments relate generally to methods and systems for configuring a service provider according to settings from a specific client appliance. More particularly, embodiments disclosed herein relate to a system and methods for configuring a battery charger according to settings for a specific battery.

BACKGROUND

For current applications where a hardware device is used in conjunction with a client appliance, a client manually enters detailed setting configurations to adapt the hardware device to different appliances. This is characteristic in the field of battery chargers adaptable to charge different types of batteries used in radio-controlled electronic (RCE) devices. RCE devices such as airplanes, cars and boats used for entertainment and other purposes have a high demand for electric batteries. The batteries drain relatively large amounts of current compared to their relatively small form factor. Battery chargers are used to recharge the batteries in outdoor RCE devices, exposed to varying environmental conditions. Moreover, different types of batteries use different charge, discharge, and re-charge configurations, which are manually entered by the client. More generally, in state-of-the-art applications, a client adapting the hardware device to a specific client appliance manually inputs configuration settings each time the hardware device is coupled to the client appliance. This process becomes time consuming and prone to errors, as the variety of client appliances increases.

Therefore, what is desired is a method and a system to provide a reliable and simple battery charger configuration for batteries in RCE devices.

SUMMARY OF THE DESCRIBED EMBODIMENTS

In a first embodiment, a method for using a service provider configurable to perform an operation on a client appliance according to a plurality of client settings is provided, the method including: retrieving appliance settings from a first memory circuit; configuring the service provider according to the appliance settings to perform an operation on the client appliance; tracking the operation of the service provider on the client appliance; storing tracking data in a second memory circuit; and providing the tracking data to a network server.

In a second embodiment, a configure, track, and provide (CTP) system to provide data resulting from a service provider coupled to a client appliance is provided, the system including: a service provider coupled with a local data storage, the service provider configured to communicate wirelessly with a CTP device including a sensor; and an appliance having a code device providing a unique identifier adapted to be read by the sensor, wherein the service provider is configured to wirelessly receive appliance settings from the CTP device to couple the client appliance when the unique identifier is recognized.

In a third embodiment, a service provider configured to perform an operation on a client appliance is provided, the service provider including a processor circuit and a memory circuit, and including: a radio-frequency (RF) antenna for wireless communication with a mobile network device; an input panel; a plurality of sensors configured to collect tracking data from the operation on a client appliance; a local data storage configured to store tracking data for the client appliance, the local data storage adapted to store configuration settings to perform the operation of the service provider on the client appliance; and a firmware stored in the memory circuit, the firmware having commands that when executed by the processor circuit cause the service provider to store in the memory circuit the collected tracking data.

In yet another embodiment, a configure, track, and provide (CTP) device having a processor circuit and a memory circuit is provided, the CTP device is configured for use with a battery charger coupled to a battery, the CTP device including: a radio-frequency (RF) antenna for wirelessly coupling with a network server and with a battery charger; and a sensor configured to receive a battery code, the processor configured to access a set of configuration parameters for charging the battery using the battery code, wherein the RF-antenna is configured to: provide the set of configuration parameters to the battery charger, and to receive battery charging data from the battery charger.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

In the figures, elements referred to with the same or similar reference numerals include the same or similar structure, use, or procedure, as described in the first instance of occurrence of the reference numeral.

DETAILED DESCRIPTION OF SELECTED EMBODIMENTS

Figure 1:
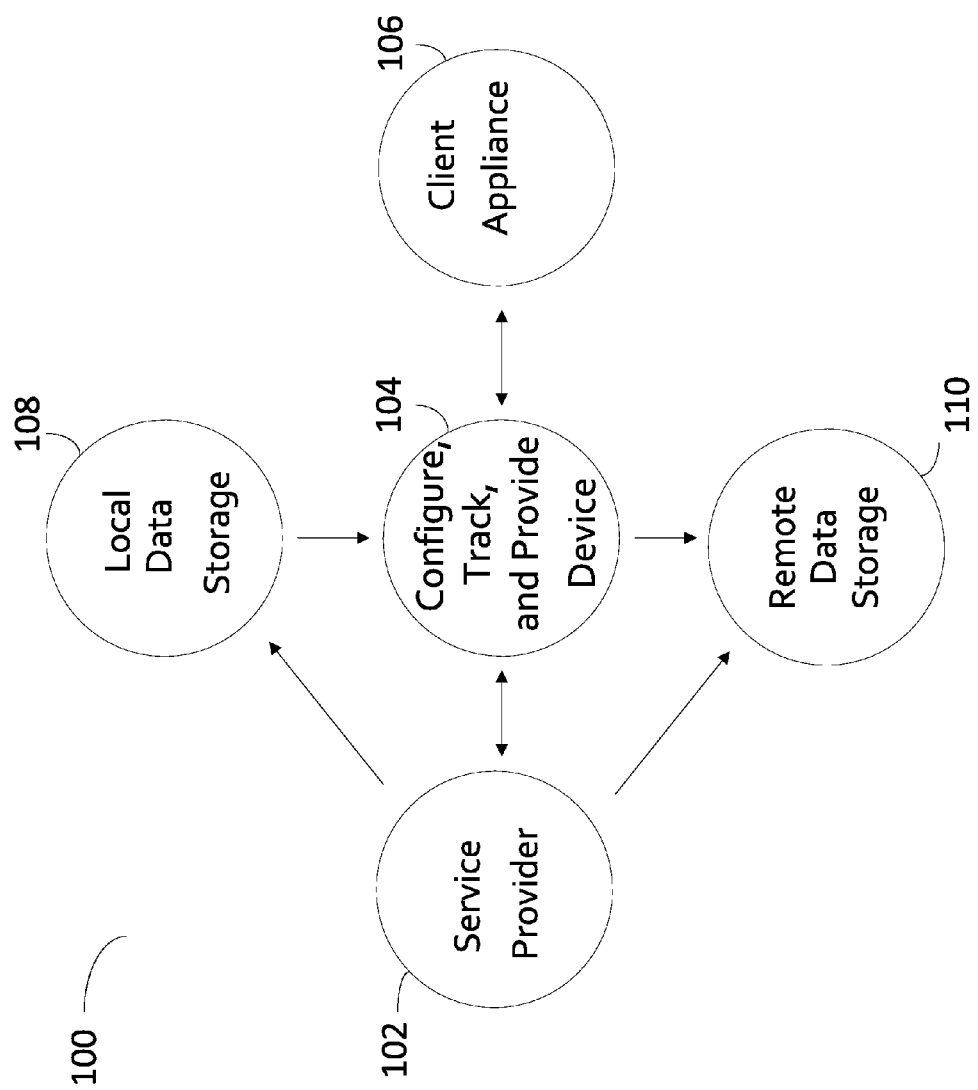
FIG. 1 illustrates a Configure, Track, and Provide (CTP) system to provide a data resulting from a service provider coupled to a client appliance, according to some embodiments.

Representative applications of methods and devices according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium for controlling manufacturing operations or as computer readable code on a computer readable medium for controlling a manufacturing line. The non-transitory computer readable medium is any data storage device that can store data, which can thereafter be read by a computer system. Examples of the non-transitory computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

Service providers in the form of hardware devices configured to be coupled to client appliances are becoming prevalent in current consumer electronics markets. In one embodiment, a service provider receives multiple configuration settings adapted to a proliferation of electronic appliances for use by clients. Each electronic appliance may have different characteristics and specifications. Accordingly, methods and systems as disclosed herein provide a simple, reliable, and a low error method of configuring the service provider for multiple client appliances. Moreover, embodiments as disclosed herein allow a client to perform multiple appliance configurations for a hardware device. Accordingly, a system as disclosed herein gives many potential clients the ability to continually reconfigure a hardware device. For example, in some embodiments a client may reconfigure the hardware device for the same appliance multiple times. In some embodiments, the client may reconfigure the hardware device according to varying environmental conditions, for the same or different appliances.

Also provided is a method and a system to track relevant data from a service provider-appliance coupling for a particular client. The service provider-appliance coupling may be an operation performed on a client appliance by the service provider. In some embodiments, methods for tracking data take advantage of mobile network devices which provide accessibility to high capacity data storage accounts in a network. In some embodiments the network may include a plurality of server stations and network links coupling the server stations to one another. Accordingly, in some embodiments a client having an appliance coupled to a service provider may use an electronic device and a user account in a network server to store tracking data for the client appliance. In some embodiments, a client may configure, track, and provide data for multiple client appliances coupled to multiple service providers.

In some embodiments, the service provider may be a battery charger, and the client appliance may be a battery. Batteries used in consumer electronic products may have many different configurations, depending on the type of consumer electronic that uses the battery. Batteries typically have a plurality of battery cells, each battery cell including electrodes, an electrolyte solution, and an ionic salt. The electrolyte solution and the ionic salt form the "chemistry" of the battery. Depending on the chemistry of the battery and the dimensions and separation of the electrodes, charging and discharging properties of the battery may change. Some examples of battery chemistries commonly used may be lithium-cobalt (LiCo), lithium-iron (LiFe), lithium-manganese (LiMn), nickel-metal hydroxide (NiMh), nickel-cadmium (NiCd), and lead (Pb). Thus, systems and methods disclosed herein may allow a battery charger to reliably and simply incorporate different battery settings in a battery charger, including different battery chemistries. Also, embodiments as disclosed herein may provide tracking data reflecting detailed battery charging information. Accordingly, tracking charge battery data over time may provide valuable information about the status and expected lifetime of a given battery.

In yet other embodiments, tracking data provided by the service provider may be accessible to a third party, in case liability issues arise between either one of a vendor of a hardware device acting as service provider, a vendor providing the appliance, and the client. Furthermore, in some embodiment a third party may be a hardware vendor interested in obtaining detailed performance information of hardware devices provided for sale. Or an appliance vendor collecting detailed performance information of an appliance provided for sale.

FIG. 1 illustrates a configure, track, and provide (CTP) system 100 to configure, track, and provide data resulting from a service provider 102 coupled to a client appliance 106, according to some embodiments. CTP system 100 may include a CTP device 104 which may be used to configure service provider 102 for coupling with client appliance 106. Accordingly, CTP device 104 may transmit to service provider 102 an identification code associated with client appliance 106. Service provider 102 may upload configuration settings for client appliance 106 according to the identification code provided by CTP device 104, searching in a local data storage 108 that stores the configuration settings. Local data storage 108 may include a memory circuit inside service provider 102. In some embodiments of CTP system 100, service provider 102 may store tracking data for client appliance 106 in local data storage 108. Service provider 102 may be a hardware device such as an automobile, a computer, or an Automated Teller Machine (ATM). In some embodiments, service provider 102 may be software code installed in a network server, or in any other type of computer device. For example, service provider 102 may be a software application configured to run in a plurality of mobile devices coupled to a network.

In some embodiments, CTP device 104 may access a remote data storage 110 to retrieve the configuration settings for client appliance 106. CTP device 104 then provides the configuration settings to service provider 102. In some embodiments, service provider 102 is configured to access remote data storage 110 and to retrieve configuration settings for client appliance 106, when a connection is available. Further according to some embodiments, CTP device 104 may retrieve tracking data from local data storage 108 and upload the tracking data to remote data storage 110. Accordingly, CTP device 104 may include a memory circuit, a processor circuit, an RF-antenna, sensors, a display, and a processor circuit. Moreover, CTP device 104 may include a Bluetooth or any similar appliance configured for wireless communication. The processor circuit is configured to perform operations using commands and data stored in the memory circuit. CTP device 104 may couple with a network server to access remote data storage 110 (cf. FIG. 1).

As described herein, CTP system 100 may include many different applications. For example, some embodiments may include a CTP system 100 for use in radio control electronics (RCE), such as radio-controlled airplanes, boats, cars, and other devices. In that regard, CTP system 100 for use in RCE applications may include a radio controller as service provider 102. In this configuration, client appliance 106 may be a radio-controlled airplane having specific settings in terms of flap orientation, maximum speed, maximum range, engine power and capacity, and other settings that may be relevant for a client. Thus, using CTP device 104 a client having a radio-controlled airplane may upload to the radio-controller the operation settings for the specific airplane, simply by transferring an identification code associated with the airplane to the radio-controller. The radio controller may configure itself according to the airplane settings associated with the identification code. The airplane settings may be stored in local data storage, in the radio controller. Furthermore, in some embodiments the client may be interested in storing in local data storage 108 certain flight routines associated to a specific airplane. Thus, CTP device 104 may provide the identification code associated with the airplane to the radio-controller, and the radio-controller may be configured according to stored configuration settings so that the airplane performs the desired flight routine.

In some embodiments, CTP system 100 is a battery charging system for use in charging batteries used in RCE appliances, such as airplanes, cars or boats. In such configuration, service provider 102 is a battery charger, and client appliance 106 is a battery coupled to the battery charger. In that regard, CTP device 104 may be used to configure the battery charger for charging, re-charging, or discharging the battery. One of ordinary skill will recognize that any suitable electronic device may be used in battery charging system 200 as CTP device 104, such as an electronic device able to wirelessly couple with the battery charger and with remote data storage 110. The battery charger may be a "smart" charger having the ability to couple to a network server. Local data storage 108 may be a Secure Digital (SD) memory card in the battery charger. Accordingly, CTP system 100 provides a reliable, simple, and low-error method to configure a battery charger to charge, re-charge, or discharge a specific battery type.

CTP system 100 may track data relating to the performance of the charger, the battery, and the status of the battery during the charge or discharge process. Using CTP system 100 a client may concatenate desired data from multiple batteries in historical sets associated with a specific battery charger and a specific battery. CTP system 100 maintains the historical data in remote data storage 110. CTP system 100 may provide the historical charging data to the user and to the manufacturer of the battery, to the user and to the manufacturer of the battery charger. Historical charging data associated to specific batteries may be provided to an engineering group that develops battery technology. More generally, historical charging data stored in remote data storage 110 or in local data storage 108 may be provided to a third party having interest in the data.

Figure 2:
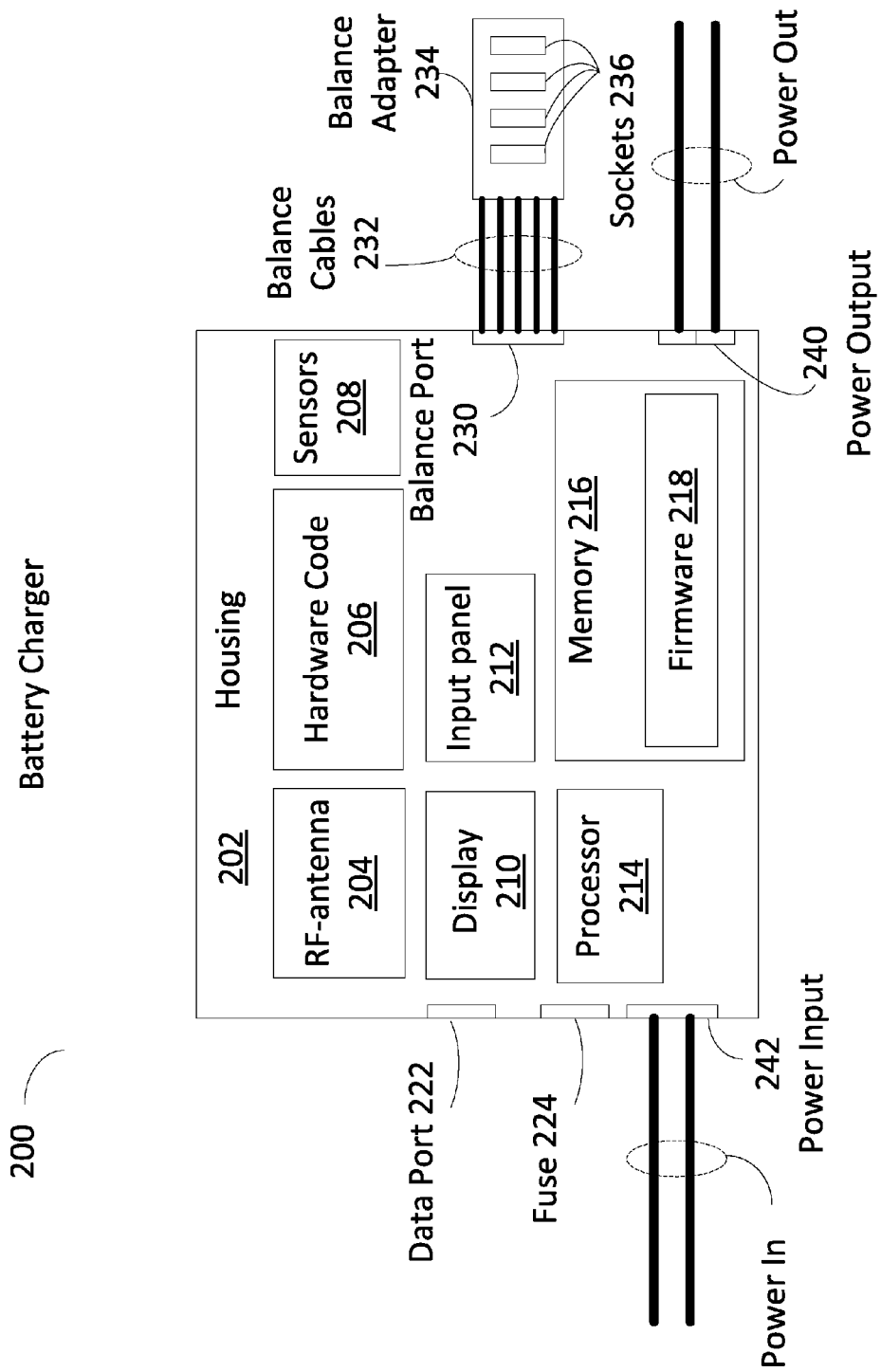
FIG. 2 illustrates a battery charger in a CTP system, according to some embodiments.

FIG. 2 illustrates a battery charger 200 for use as service provider 102 in CTP system 100, according to some embodiments. Battery charger 200 may include a housing 202 including an RF-antenna 204, a hardware code 206, and a plurality of sensors 208. RF-antenna 204 may include a Bluetooth appliance or any other device for wireless communication. In some embodiments, battery charger 200 may include a display 210 to provide visual interaction with a client. Display 210 may include a touch sensitive screen including a menu of options for the client to input commands through an input panel 212. In some embodiments, input panel 212 may include a button to start the battery charging or discharging (e.g., 'charge/discharge') once a battery charging or discharging configuration is loaded into battery charger 200. Further according to some embodiments, input panel 212 may include buttons to scroll (e.g. 'up' and 'down' a list of items), select (e.g., 'enter'), and select mode of operation (e.g., 'mode'). Hardware code 206 is an identification code recognizable by CTP device 104. Hardware code 206 may be associated with a network account for a vendor that provides battery charger 200. Battery charger 200 may also include a processor circuit 214 and a memory circuit 216. Processor circuit 214 may be configured to execute operations using commands and data stored in memory circuit 216. Memory circuit 216 may be an SD card. More generally, memory circuit 216 may include a firmware 218 having commands executable by processor circuit 214. The commands in firmware 218 may be specifically oriented to perform a battery charging or discharging operation in CTP system 100, and oriented to store historical charging data in memory circuit 216.

Sensors 208 may include a plurality of sensors 208 associated to battery charging or discharging, such as a charge sensor, a voltage sensor, a current sensor, and a clock, or timer. Accordingly, battery charger 200 may include at least one of a voltage sensor and a current sensor for each of a plurality of battery cells in a battery. In some embodiments sensors 208 may also include a temperature sensor, and other environmentally sensitive devices, such as a humidity sensor and a pressure sensor. Accordingly, sensors 208 may provide detailed charging data. The charging data may be stored in memory circuit 216. Moreover, battery charger 200 may be configured to actively respond to certain measurements provided by sensors 208. For example, for a given battery an initial charge value may be too low, indicating a malfunctioning or damaged battery. In some configurations the charge value for a given battery may be above a tolerance value, indicating potential damage to the battery if the charging proceeds. Further according to some embodiments, the environmental conditions may indicate that the charging process be stopped, paused, or postponed. For example, in some configurations the ambient temperature may be above a threshold level, so that the charging process proceeds at the client's liability.

Battery charger 200 includes a power input 242 to couple input cables to provide current from an external power source. The external power source may provide direct current (DC) or alternate current (AC) to power input 242. In some embodiments, a DC current is provided from a wall-plugged AC/DC converter. In some embodiments, a DC current is provided from another battery, such as an automobile battery or a motorcycle battery. Battery charger 200 is coupled with a battery through output cables from power output 240, for charging the battery. A balance port 230 in battery charger 200 is coupled with a balance adapter 234 through a plurality of balance cables 232. Balance adapter 234 includes a plurality of sockets 236, to receive a balance connector from a charging or discharging battery. Balance port 230 is thus configured to provide battery charger 200 with status information about the charging process in each of a plurality of battery cells coupled to balance adapter 234. Battery charger 200 may determine the status information using sensors 208, processing the received signals with processor 214, and displaying the results in display 210. Thus, the client may obtain a real-time graphic representation of the battery charging or discharging process. Furthermore, charging data resulting from the signals received at balance port 230 and processed by processor 214 may be stored in memory circuit 216. Accordingly, battery charger 200 may transmit the stored charging data to CTP device 104, using RF-antenna 204. In some embodiments, the charging data may be stored in remote data storage 110 by battery charger 200 using RF-antenna 204, by CTP device 104, or by both battery charger 200 and CTP device 104.

In some embodiments, battery charger 200 may include a data port 222 to be coupled with a computer device. For example, data port 222 may be a Universal Serial Bus (USB) port that enables data exchange between battery charger 200 and a personal computer. In such configuration, the operation of battery charger 200 may be monitored or even controlled by the personal computer through data port 222. In some embodiments battery charger 200 may include a fuse 224 to prevent from overloading battery charger 200 in the event of battery malfunction, such as a short-circuited battery cell.

In some embodiments, battery charger 200 may include multiple power outputs 240 in CTP system 100. Each of the multiple power outputs 240 may be used to charge a different type of battery, independently of each other. For example, in some embodiments one battery output may be configured to provide charge to a nickel-metal hydroxide (NiMh) battery, while a different battery output may be configured to provide charge to a nickel-cadmium (NiCd) battery, a lithium iron (LiFe) battery, a lithium cobalt (LiCo) battery, a lithium manganese (LiMn) battery, or even a lead acid battery. In that regard, a plurality of balance adapters 234 may each include a different number of sockets 236, adapting to different number of battery cells coupled to each adapter. Processor circuit 214 and memory circuit 216 may thus be configured to handle charging data from different balance ports 230 separately and independently of one another.

Figure 3:
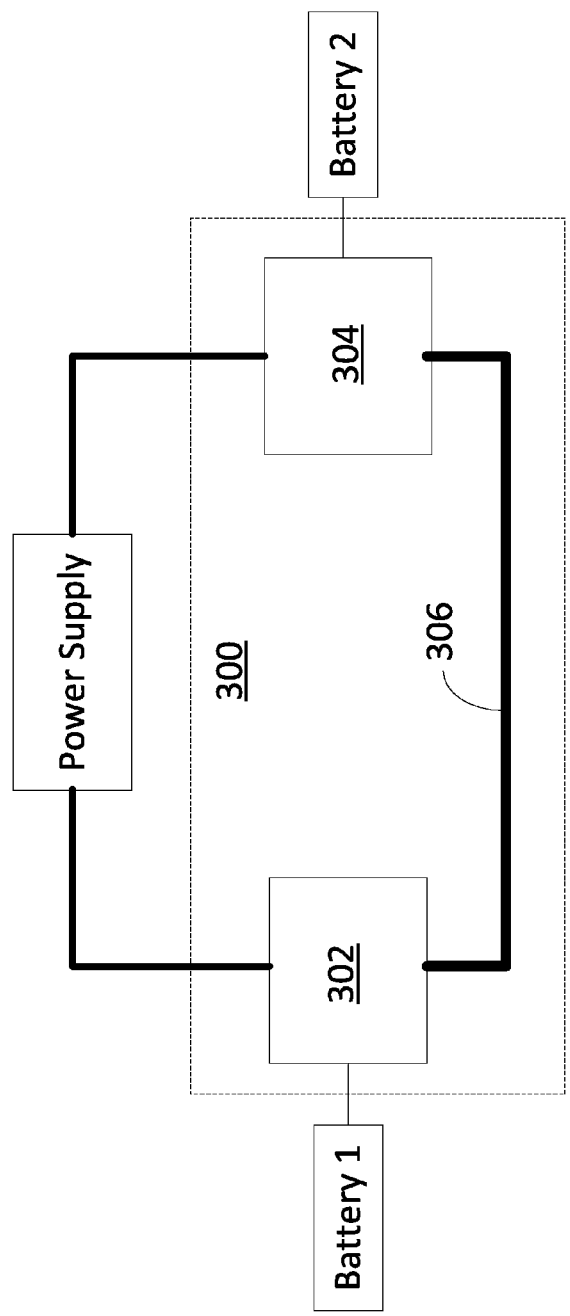
FIG. 3 illustrates a multiple battery charger in a CTP system, according to some embodiments.

FIG. 3 illustrates a multiple battery charger 300 in CTP system 100, according to some embodiments. Multiple battery charger 300 may include a master battery charger 302 charging battery 1, and a slave battery charger 304 charging battery 2. A power supply may provide input power to both master battery charger 302 and slave battery charger 304. Each of master battery charger 302 and slave battery charger 304 may include all the components of a battery charger such as described above (e.g., battery charger 200, cf. FIG. 2). Multiple battery charger 300 operates with master battery charger 302 in control of slave battery charger 304 through a communication channel 306. Accordingly, master battery charger 302 may provide charge, re-charge, and discharge settings to slave battery charger 304 through communication channel 306. The charging settings provided by master battery charger 302 to slave battery charger 304 may be configured according to battery 2. In some embodiments, slave battery charger 304 may provide master battery charger 302 with charging data and other information retrieved from the charging of battery 2. Communication channel 306 may be a network cable. In some embodiments, communication channel 306 may be a wireless communication channel between master battery charger 302 and slave battery charger 304. In that regard, communication channel 306 may be operated via RF-antennas in each of master battery charger 302 and slave battery charger 304 (e.g., RF-antenna 204 in battery charger 200, cf. FIG. 2).

Figure 4:
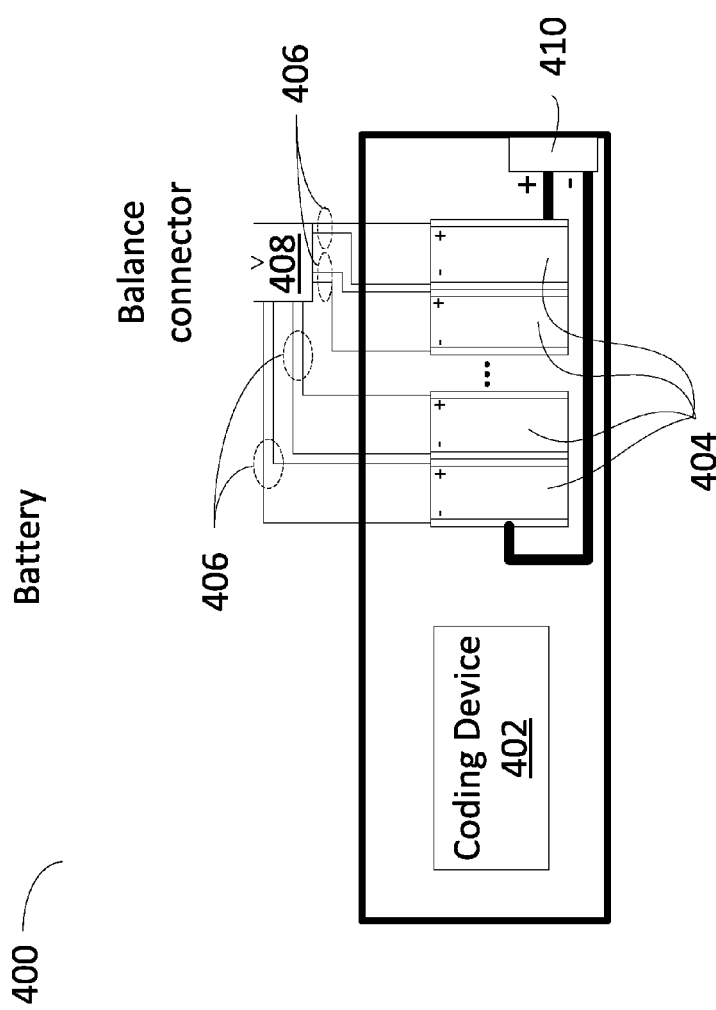
FIG. 4 illustrates a battery having a coding device for use in a CTP system, according to some embodiments.

FIG. 4 illustrates a battery 400 having a coding device 402 for use in CTP system 100, according to some embodiments. Accordingly, battery 400 may be as client appliance 106 in embodiments where CTP system 100 is a battery charging system using battery charger 200 as service provider 102 (cf. FIGS. 1 and 2). Coding device 402 includes an identification code for battery 400. Accordingly, coding device 402 may be a barcode, a quick response (QR) code, or any other type of accessible code such as a decal or a sticker securely fixed to battery 400. Coding device 402 may be remotely accessed, or accessed by a near-field contact (NFC) device or a camera configured for video capture, or other type of sensors included in CTP device 104 (cf. FIG. 1). Battery 400 may include a plurality 'n' of battery cells 404. The number 'n' of battery cells included in each battery may vary according to the specific uses for battery 400. One of ordinary skill will recognize that 'n' may be one (1), two (2), or any other integer number, such as four (4), ten (10), or even larger. Battery cells 404 are coupled in series to form an electric circuit having positive and negative polarity through a terminal 410. Terminal 410 may be adapted to provide a high current load to charge battery 400. In addition, battery 400 may include a balance connector 408 having cell terminals 406. Each of cell terminals 406 is coupled to a battery cell 404 so that the electric signal from each of cell terminals 421 may be associated to a charge, a current, a voltage, and an internal resistance measured for each battery cell 404. Different types of batteries may have different charging configuration settings. For example, a single cell in a NiMh battery typically charges up to 1.2 V. In the case of a LiCo battery, a single cell charges up to 3.7 V. In some embodiments, LiFe battery cells may be used, for example, $LiFePO_4$ cells charging at about 3.3 V (each cell) may be used in some embodiments.

Balance connector 408 provides an indication of the electric status for each of battery cells 404 to a battery charger (e.g., battery charger 200, cf. FIG. 2). Accordingly, balance connector 408 may be configured to engage with at least one of sockets 236 in balance adapter 234 of battery charger 200. The charging or discharging status for each of battery cells 404 may indicate an operational condition of battery 400. Accordingly, a battery charger coupled to battery 400 and providing current through terminal 410 may use information collected from balance connector 408 to adjust the charging or discharging process. For example, battery charger 200 may determine that one of cells 404 (cell 'j', where 'j' is less than or equal to 'n') may be charging more rapidly than the others. In such situation, battery charger 200 may be configured to slightly discharge cell 'j' by draining a battery cell current in the corresponding terminal 406. Thus, equalizing the charge level among different battery cells 404. In that regard, terminals 406 are configured to measure a battery cell voltage and to drain a battery cell current when the battery cell voltage is above a selected value. In some embodiments the different status of each of battery cells 404 as determined by battery charger 200 from balance connector 408 may indicate a malfunctioning battery, such that battery charger 200 stops charging or discharging the battery. In some embodiments, instead of stopping battery charging upon a differentiated cell status, battery charger 200 may reduce the current through a terminal 406 to a battery cell 404.

Figure 5:
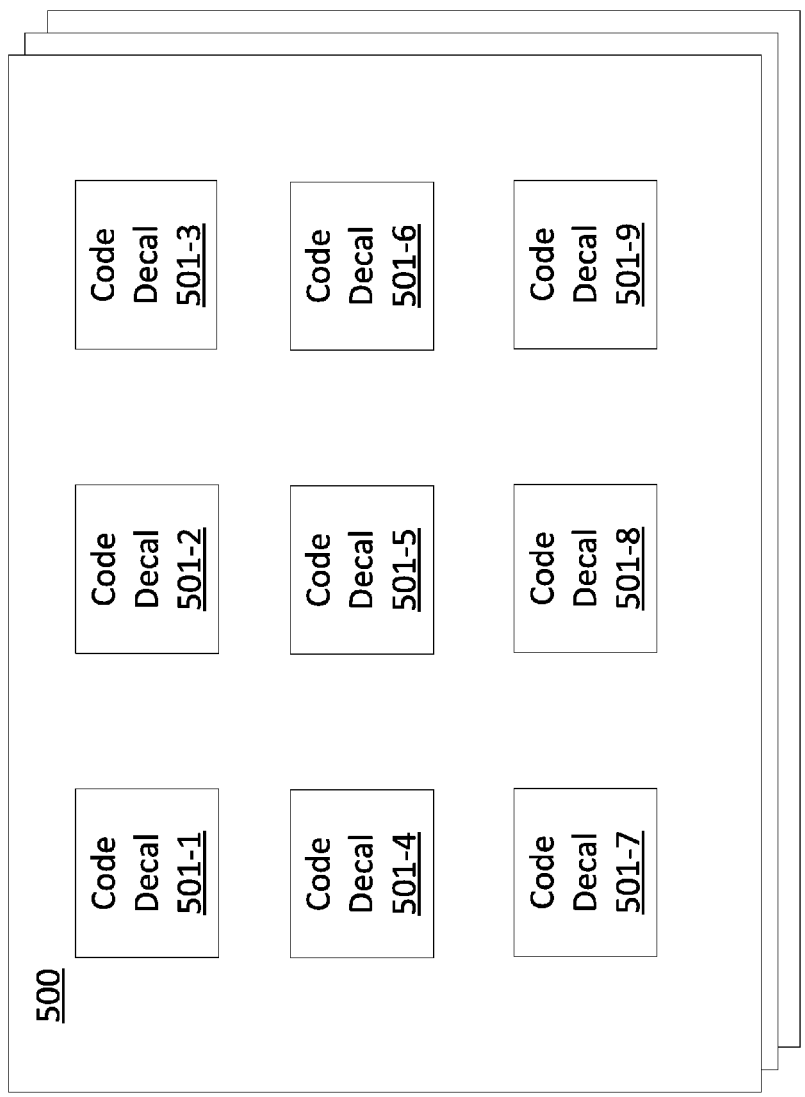
FIG. 5 illustrates a plurality of code decal sheets for use in a CTP system, according to some embodiments.

FIG. 5 illustrates a plurality of code decal sheets 500 for use in CTP system 100, according to some embodiments. Each of code decal sheets 500 includes a plurality of code decals 501-1 through 501-9 (collectively referred hereinafter as code decals 501). Each code decal 501 may be attachable to a single client appliance, such as a battery, and serve as an identification code for each particular appliance. Code decal sheets 500 may be supplied to a client either at a store or by mail, upon request. The client attaches a code decal 501 to an appliance, so that the appliance may be used in CTP system 100. For example, the client may apply each code decal 501 to a battery, so that the battery may be used in CTP system 100. Together with acquiring decal sheets 500, the client may reserve storage space in remote data storage 110 (cf. FIG. 1).

Figure 6:
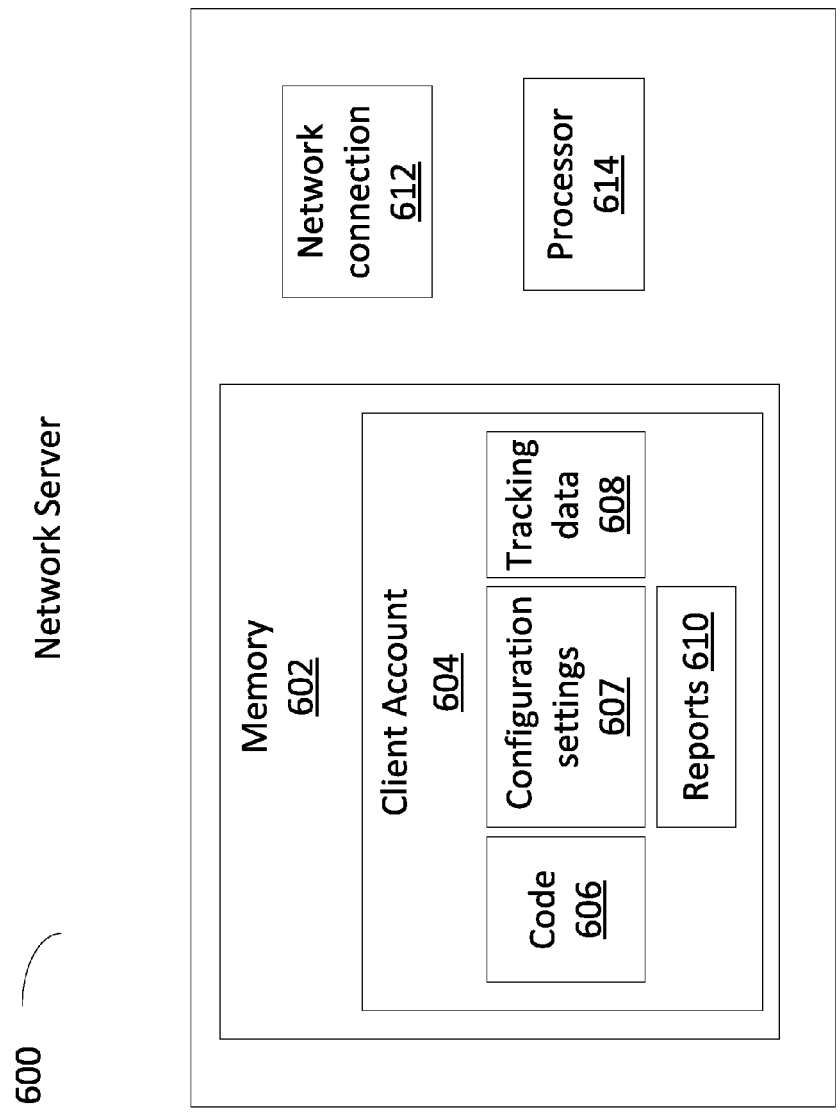
FIG. 6 illustrates a network server for use in a CTP system, according to some embodiments.

FIG. 6 illustrates a network server 600 for use as remote data storage 110 in CTP system 100, according to some embodiments. Network server 600 includes a memory circuit 602, a network connection device 612 coupled to a network link, and a processor circuit 614. Processor circuit 614 is configured to perform operations according to commands and data stored in memory circuit 602. Memory circuit 602 may include a client account 604 accessible by a server administrator and a client having login information. The client login may include a name, such as an already existing account name, and a password. Client account 604 may include a list of client appliance codes 606, each client appliance code 606 associated with a plurality of configuration settings 607 and tracking data 608. Configuration settings 607 may include battery charging and discharging settings, such as battery chemistry, number of battery cells, maximum voltage, and charging rate among other parameters. Tracking data 608 may include battery charging and discharging information, such as a historical charging and discharging battery data. Tracking data 608 may also include error messages and alerts issued by service provider 102, by CTP device 104, or by network server 600. In some embodiments, client account 604 may also include at least one of a plurality of reports 610 created by processor circuit 614 using tracking data 608. Reports 610 may include an overall estimate of the condition of a battery, or any other client appliance associated with code 606. Accordingly, the client may have access to at least portions of reports 610. Moreover, in some embodiments the client associated with client account 604 may receive in CTP device 104 a warning or a message from network server 600 related to the status of client appliance 106. The warning may include at least portions of reports 610. Network server 600 may keep in memory circuit 602 an updated version of firmware 218 (cf. FIG. 2). Thus, network server 600 may provide the updated version of firmware 218 to CTP device 104. Accordingly, CTP device 104 may transmit the updated version of firmware 218 to service provider 102 (e.g., battery charger 200, cf. FIG. 2). In that regard, a client may use CTP device 104 to log into client account 604 to access configuration settings 607 or tracking data 608 for client appliance 106 associated with a codified signal. CTP device 104 may also include a display to provide a graphic representation of tracking data 608.

Figure 7A:
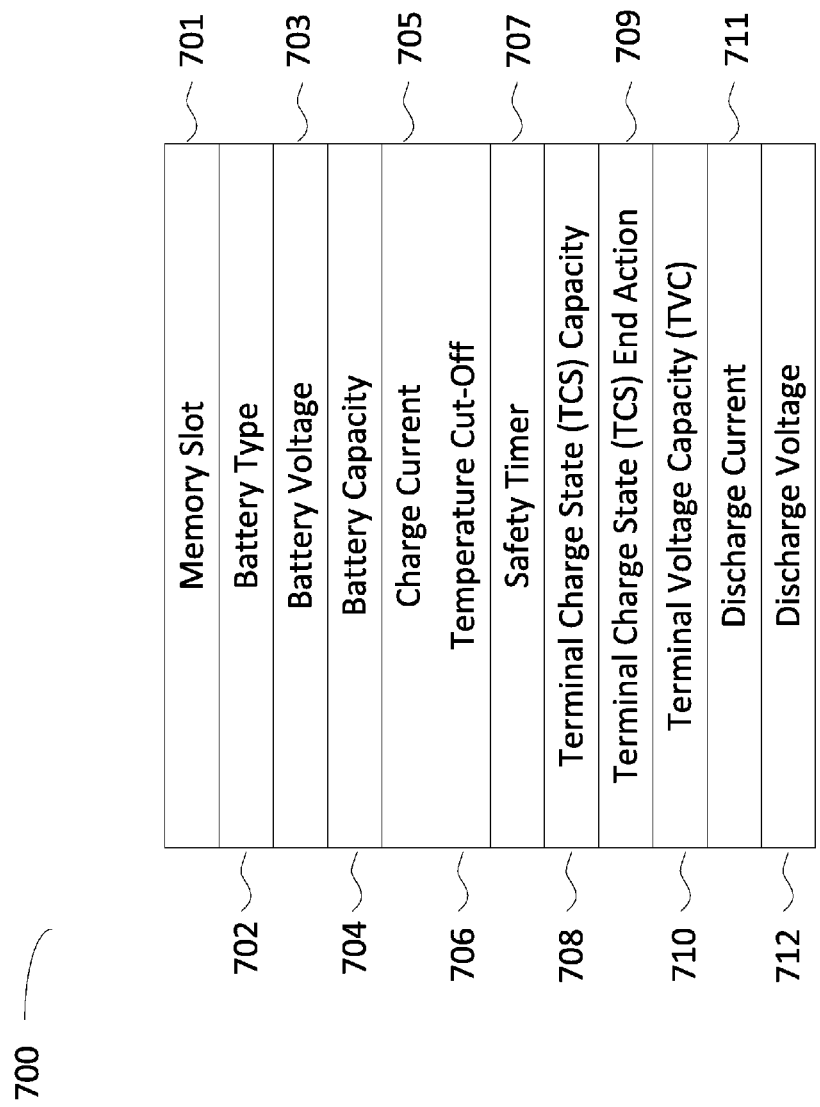
FIG. 7A illustrates configuration settings in a CTP system, according to some embodiments.

FIG. 7A illustrates configuration settings 700 in CTP system 100, according to some embodiments. Configuration settings 700 may include input values for a firmware embedded in a battery charger (e.g., firmware 218 in battery charger 200, cf. FIG. 2). Configuration settings 700 may include a memory slot number 701, a battery type 702, a battery voltage 703, a battery capacity 704, a charge current 705, a temperature cut-off 706, a safety timer 707, a Terminal Charge State (TCS) capacity 708, a TCS end action 709, and a Terminal Voltage Capacity (TVC) 710. Configuration settings 700 may also include a discharge current (in Amperes, or Amps) 711, and a discharge voltage 712, according to some embodiments.

Memory slot number 701 may reserve a particular space in a memory circuit (e.g., in CTP device 104, cf. FIG. 1, memory circuit 216, cf. FIG. 2, and memory circuit 602, cf. FIG. 6) for the values of configuration settings 700 associated with a particular battery (e.g., battery 400, cf. FIG. 4). Battery type 702 may include values such as LiCo, LiFe, LiMn, NiMh, NiCd, Pb, and other battery types described in detail above. Battery voltage 703 may include the total voltage that the battery may achieve. In that regard, battery voltage 703 may be related to the total number of battery cells included in the battery, and the nominal voltage for those cells. For example, a LiCo battery having 4 cells, with a nominal voltage of 3.7 V per cell, may have a battery voltage 703 of 4×3.7 V=14.8 V. Likewise, a LiFe battery having 4 cells, with a nominal voltage of 3.3 V per cell, may have a battery voltage 703 of 4×3.3=13.2 V. Battery capacity 704 may include a value of current per unit time that the battery may deliver when fully charged. Typically, this value may be provided in milli Amperes per hour (mAh) or Amp hours (Ah). Charge current 705 includes a value of current that may be used to charge the battery when the charger is in charging mode. In some embodiments, charge current 705 may be provided in Amperes (A). Temperature cut-off 706 is the value of temperature beyond which a battery charging process is stopped. Safety timer 707 includes a value of time after which a battery charging may be terminated, regardless of the charging status of the battery. Terminal Charge State (TCS) capacity 708 may be a percentage of the full charge capacity of the battery desired to be reached during the charging process.

Terminal Voltage Capacity (TVC) 710 may include a voltage exceeding a recommended terminal voltage for a battery. In some embodiments, an alert issued by battery charger 200 or electronic device 700 indicates the client that the setting for TVC 710 may pose a safety hazard, and the user is left to modify it at no liability to a third party. In some cases, an expert client may desire to slightly overload the battery capacity during a short period of time, due to a particularly demanding application such as a radio controlled (RC) car race. For example, TVC 710 may be 4×4.2 V=16.8 V for the above described LiCo battery having four cells, at 4.2 terminal voltage each. And TVC 710 may be 4×3.65 V=14.6 V for the above described LiFe battery having four cells, at 3.65 V terminal voltage each. Discharge current 711 determines the rate of discharge in ampere (A) desired during a discharge cycle. Discharge voltage 712 is the cut-off voltage (may be under discharge load or resting, depending on application goals) at which discharge is to be terminated.

As an exemplary embodiment, configuration settings 700 for a NiMh battery having six battery cells may include memory slot 801 of '1', and battery type 702 'NiMh.' Battery voltage 703 may be 7.2V (=6×1.2 V), and battery capacity 704 may be 1800 mAh, with charge current 705 of 1.8 A. In some embodiments, such as illustrated with the NiMh battery, configuration settings 700 may further include a peak sensitivity of 3 mV/C (mili-Volt per Cell), a trickle current of 0 mA, and a peak delay of 3 minutes. The peak sensitivity is the sensitivity ($\Delta V$) of a voltage sensor 208 in battery charger 200 associated with a charging stoppage. For example, in the case of NiMh batteries, the peak sensitivity is a negative value associated with a voltage drop, typically occurring when the battery has been sufficiently charged. In some embodiments, peak sensitivity $\Delta V$ is associated with a reduced voltage increment as the charging current flows into the battery. In that regard, battery charger 200 may be configured to stop charging the battery once a voltage increment is reduced below a selected $\Delta V$ value. The trickle current may be associated with the charging current for a battery once it is fully charged, if the battery remains coupled to the battery charger. The peak delay modifies the peak detection circuit in voltage sensor 208 to maintain charge for a specified time after $\Delta V$ is detected. Temperature cut-off 706 may be about 50° C., or less (for a NiMh battery). A safety timer 707 sets a time after which the charging is stopped regardless of any triggering event. In some embodiments, safety timer 707 may be selected to be about 300 minutes. TCS capacity 708 for a NiMh battery may be 100%. In discharge mode, discharge current 711 for a NiMh battery having 4 cells may be 1 A, and the discharge voltage may be 0.8 V per cell. One of ordinary skill in the art will recognize that the above values for configuration settings 700 are illustrative only, and not limiting of ranges and values that may be used in some embodiments. For example, different battery types having different number of cells per pack, or chemistry different from NiMh, may be associated with a different set of configuration settings.

Configuration settings 700 may be provided to battery charger 200 manually by a client upon charging or discharging battery 400 for the first time. Configuration settings 700 may then be stored in a memory circuit (e.g., CTP device 104 or local data storage 108 cf. FIG. 1). A copy of configuration settings 700 may also be stored in memory circuit 602 of network server 600 associated with client account 604, as configuration settings 607 for a battery associated with code 606. In some embodiments, CTP system 100 may be configured to maintain an updated copy of configuration settings 700 associated with a battery for a given client, in network server 600. In that regard, CTP system 100 may continuously synchronize memory circuit 216 in battery charger 200, memory circuit 602 in network server 600, and memory circuit 702 in electronic device 700. Accordingly, due to network connectivity issues, network server 600 may have sporadic access to configuration settings 700 stored in CTP device 104, or in local data storage 108. Thus, when network connectivity is established between electronic device 700 and network server 600, and the client logs into client account 604 in network server 600, client account 604 may be updated according to the data in configuration settings 700 stored in electronic device 700.

Figure 7B:
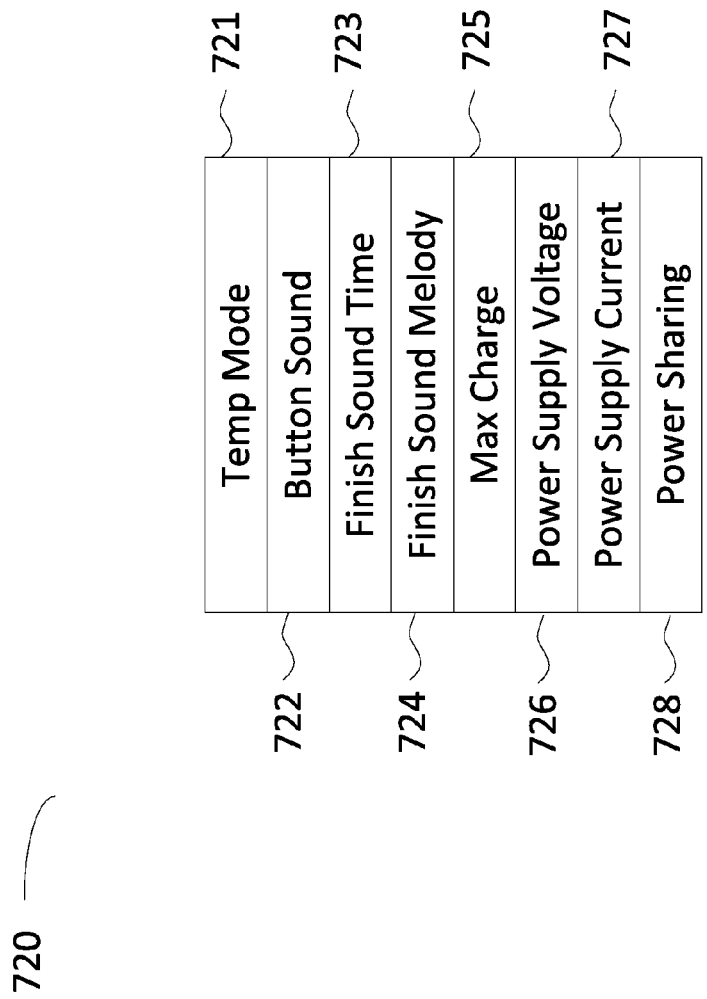
FIG. 7B illustrates display configuration settings in a CTP system, according to some embodiments.

FIG. 7B illustrates display configuration settings 720 in CTP system 100, according to some embodiments. Display configuration settings 720 may include input values for a firmware embedded in a battery charger (e.g., firmware 218 in battery charger 200, cf. FIG. 2). The display to be configured by display configuration settings 720 may be a display in the battery charger (e.g., display 210 in battery charger 200, cf. FIG. 2). In some embodiments, the display to be configured by display configuration settings 720 may include the display of CTP device 104. In some embodiments of battery charging system 200, a client may input display configuration settings 720 through CTP device 104. Display configuration settings 720 may include a 'temp mode' 721, a 'button sound' 722 to select the sound of a button in the display, a 'finish sound time' 723 and a 'finish sound melody' 724 for the end of a charge or discharge procedure. Display configuration settings 720 may include a 'maximum charge' 725 indicating the maximum charge recommended for a given battery, and a 'power supply voltage' 726, indicating the power supply voltage provided to battery charger 200. Display configuration settings 720 may also include a 'power supply current' 727 indicating the current provided by the power supply to battery charger 200, and a 'power sharing' 728 setting to indicate whether or not the power supply is being shared by two or more battery chargers (e.g., master battery charger 302 and slave battery charger 304, cf. FIG. 3).

Figure 7C:
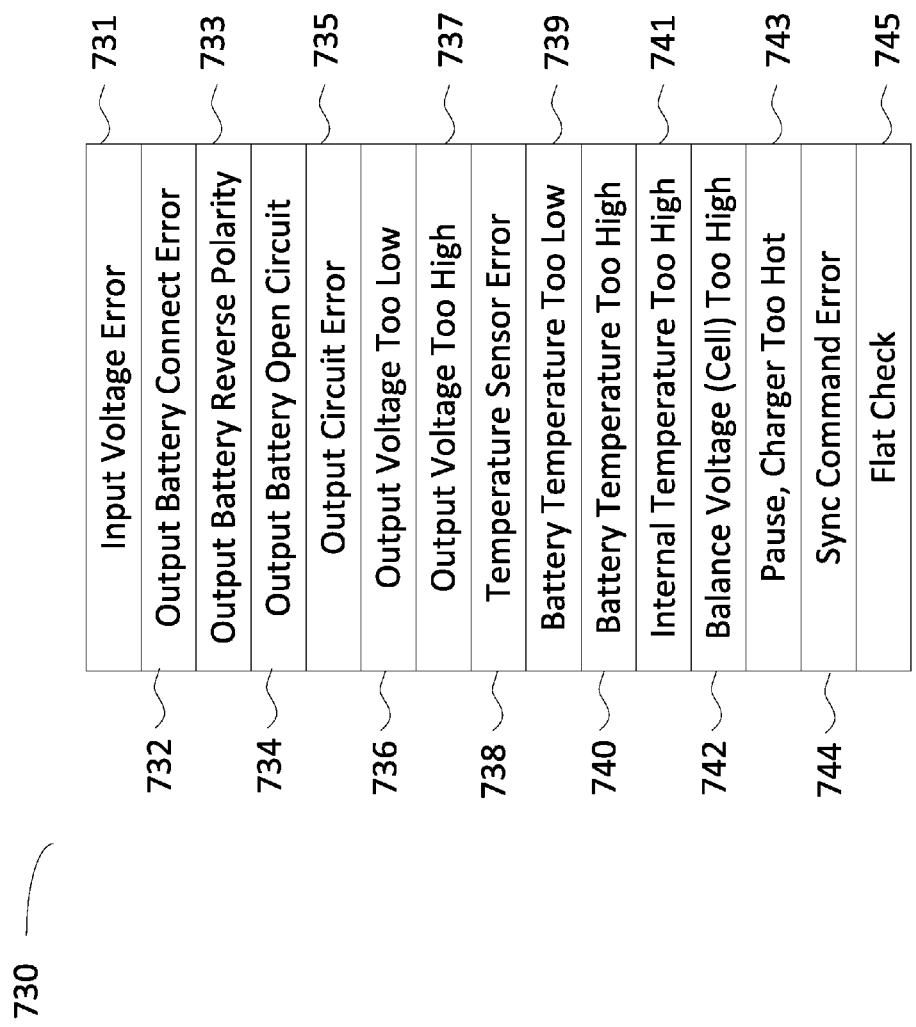
FIG. 7C illustrates error messages in a CTP system, according to some embodiments.

FIG. 7C illustrates error messages 730 in CTP system 100, according to some embodiments. Error messages 730 may include output values from a firmware embedded in a battery charger (e.g., firmware 218 in battery charger 200, cf. FIG. 2). Error messages 730 may include an 'input voltage' error 731 triggered when a measured input voltage differs from an expected input voltage based on a battery identification code. An 'output battery connect' error 732 indicates that battery 400 is not properly connected to battery charger 200. An 'output battery reverse polarity' error 733 indicates that battery 400 is connected in a reverse polarity to battery charger 200. An 'output battery open circuit' error 734 indicates that one of the battery terminals is not properly connected to battery charger 200. An 'open circuit' error 735 indicates an open circuit condition in battery charger 200. An 'output voltage too high' error 737 indicates a battery voltage beyond expected values according to the battery identification. A 'temperature sensor' error 738 indicates that a temperature sensor in battery charger 200 is not working properly. A 'battery temperature too low' error 739, a 'battery temperature too high' error 740, and an 'internal temperature too high' error 741 are related to temperature sensing parameters in battery charger 200. A 'balance voltage too high' error 742 may indicate a specific cell in a battery pack that has a voltage beyond acceptable values. A 'pause (charger too hot)' error 743 may occur when the battery charger detects overheating of the battery, pausing the charging process. A 'sync command' error 744 and a 'flat check' error 745 may refer to internal operation conditions in battery charger 200 detected by firmware 218. Accordingly, any one of error messages 730 may be displayed on display 210 of battery charger, or on display 710 of electronic device 700, as soon as battery charger 200 detects the error. In some embodiments, any one of error messages 730 that has occurred during a battery charging or discharging process may be logged into memory circuit 216 and transmitted to network server 600 as part of tracking data 608, or included in reports 610 (cf. FIG. 5).

Figure 8:
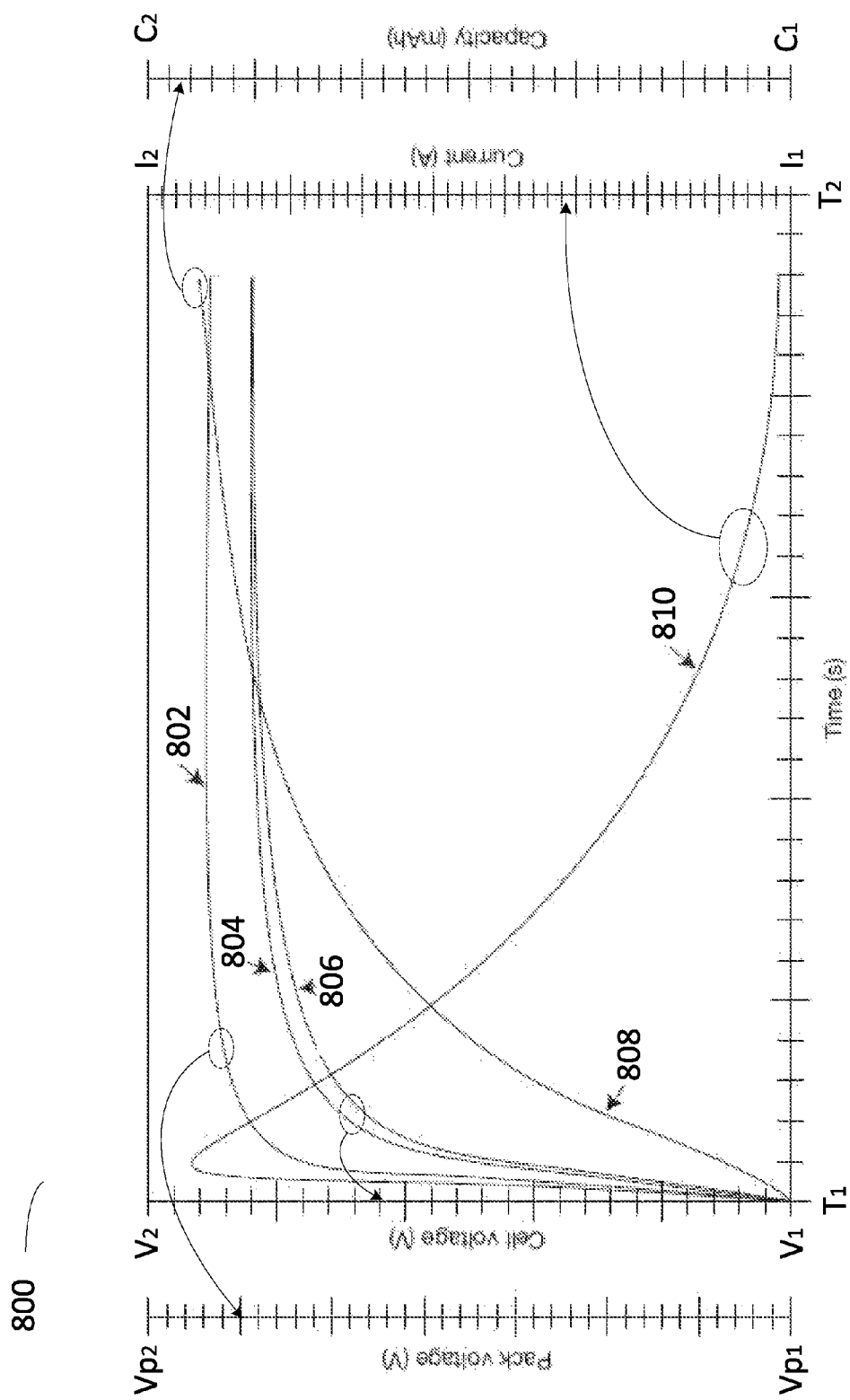
FIG. 8 illustrates a charging data resulting from a CTP system, according to some embodiments.

FIG. 8 illustrates a charging data 800 resulting from CTP system 100, according to some embodiments. Charging data 800 may be collected by battery charger 200 while charging battery 400, and may be stored local data storage 108 (cf. FIG. 1). Charging data 800 may include traces for a pack voltage 802, a first battery cell voltage 804, a second battery cell voltage 806, a charged capacity 808, and a charge current 810. The traces in charging data 800 may be displayed as plots with an abscissa indicating a time value (e.g., seconds), and an ordinate indicating a pack voltage, in volts (trace 802); a cell voltage, in volts (traces 804 and 806); a current, in Amperes (trace 810); and a charge capacity, in mAh (trace 808). While charging data 800 in FIG. 8D shows voltage traces for two battery cells (i.e., 804 and 806), the number of battery cell voltages tracked is not limiting. Accordingly, for a battery having four battery cells, charging data 800 may include battery cell voltage traces for each of the four battery cells.

In some embodiments, the pack voltage scale may span values ($Vp_1$, $Vp_2$) from 11.4 V to 12.8 V. The cell voltage scale may span values ($V_1$, $V_2$) from 3.8 V to 4.3 V. The current scale may span values ($I_1$, $I_2$) from 0 to 18 A. The capacity scale may span values ($C_1$, $C_2$) from 0 to 1200 mAh. And the time scale may span values ($T_1$, $T_2$) from 0 to 1500 s. The values provided above and illustrated in FIG. 8D correspond to a specific battery pack including three (3) LiCo battery cells, of which two battery cell voltage traces are shown, for simplicity. One of ordinary skill will recognize that the scale ranges of ordinates and abscissae in charging data 800 may vary according to the number of cells in the battery, and the cell chemistry. Charging data 800 may be used by CTP device 104 to analyze battery charging performance and detect a problem or an issue that requires the client's attention. Charging data 800 is transmitted from CTP device 104 to network server 600 to be stored as tracking data 608 (cf. FIG. 6). In some embodiments, an analysis of charging data 800 may be performed by battery charger 200, and an alert may be issued from battery charger 200 to CTP device 104 for display to the client. Also, CTP device 104 may transmit the analysis results and the alert issue to network server 600 to be included in reports 610 (cf. FIG. 5).

In some embodiments of CTP system 100, a manufacturer of battery charger 200 may use charging data 800 and error messages 730 to determine whether or not it is desirable to release an updated version of firmware 218. In that regard, the manufacturer may have access to aggregated data in network server 600 from a plurality of clients using a specific type of battery charger. For example, with access to the aggregated data, the manufacturer may determine that certain options in configuration settings 700 may be removed, added, limited, or expanded. More specifically, the manufacturer may determine reducing temperature cut-off 706 for certain types of batteries. Also, the manufacturer may determine that TVC option 710 be removed—or restricted in range—for certain types of batteries, given the nature or quantity of errors encountered by clients using this feature.

Figure 9:
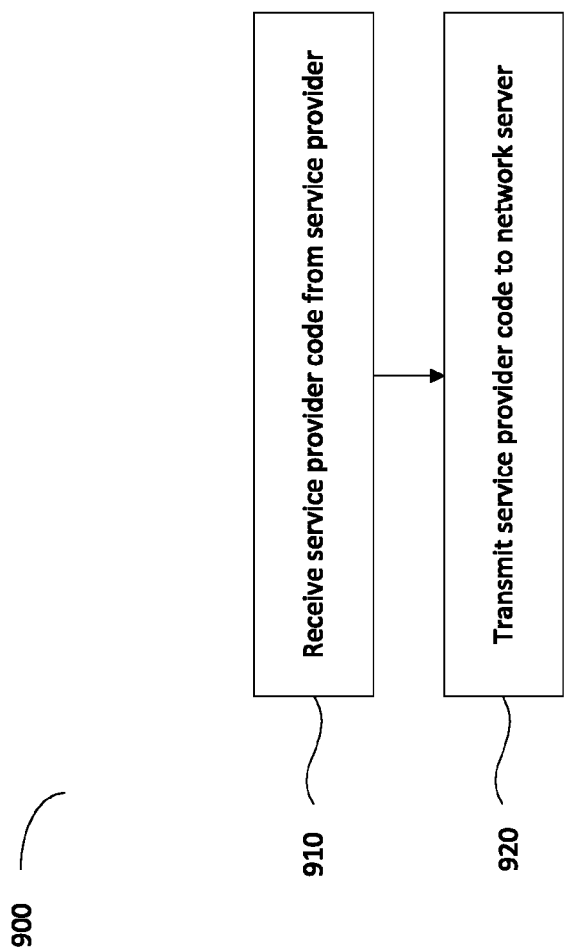
FIG. 9 illustrates steps in a method for configuring, tracking, and providing an appliance data to a client, according to some embodiments.

FIG. 9 illustrates steps in a method 900 for configuring, tracking, and providing an appliance data to a client, according to some embodiments. Method 900 may be performed in connection with CTP system 100 (cf. FIG. 1). Accordingly, steps in method 900 may be partially or entirely performed by a processor circuit in a CTP device (e.g., processor circuit 714 in electronic device 700, cf. FIG. 7). The processor circuit may execute operations using commands and data stored in a memory circuit in the CTP device (e.g., memory circuit 702 in electronic device 700, cf. FIG. 7). The client may couple a client appliance to a service provider (e.g., client appliance 106 and service provider 102, cf. FIG. 1), to perform an operation on the client appliance.

Step 910 includes receiving a service provider code from the service provider. In some embodiments the service provider is a battery charger, and the service provider code is a hardware code that identifies the battery charger to the CTP system in method 900 (e.g., hardware code 206, in battery charger 200 cf. FIG. 2). Step 920 includes transmitting the service provider code to the network server. In that regard, the service provider code may be associated with a client account in the network server (e.g., client account 604 in network server 600, cf. FIG. 6). Moreover, the service provider code may be associated with a vendor account in the network server. For example, a vendor providing hardware for the service provider may desire to use method 900 in a system as disclosed herein to collect data on hardware performance. The data thus collected may be used by the vendor for technical improvements and hardware maintenance, for marketing purposes, or for liability coverage. It will be recognized by one of ordinary skill that a method for configuring, tracking, and providing an application data to a client such as method 900 may include any one of steps 910 and 920 described above, performed in any order, or simultaneously in time. Furthermore, in some embodiments a method for configuring, tracking, and providing an appliance data to a client as described herein may include at least one of steps 910 and 920, described above.

Figure 10:
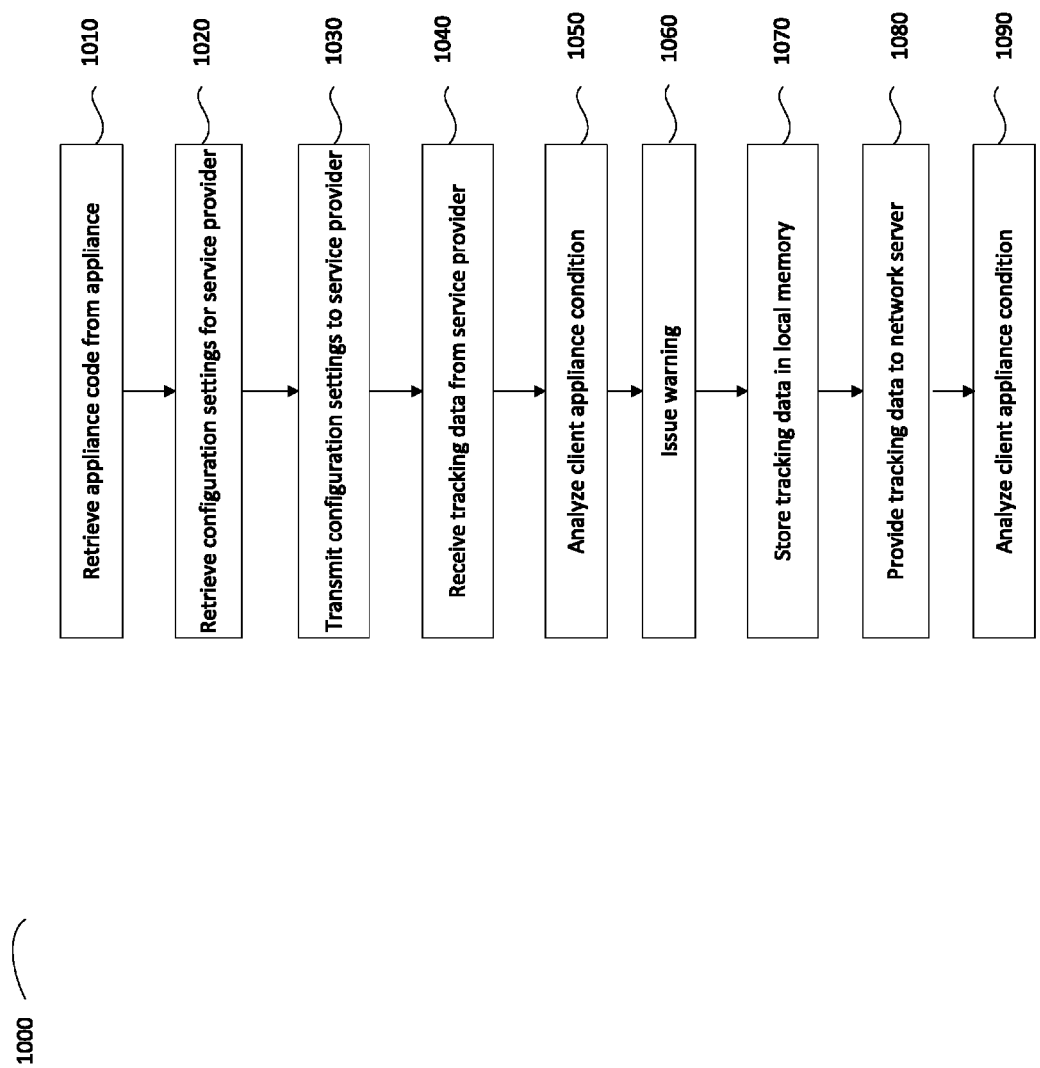
FIG. 10 illustrates steps in a method for configuring, tracking, and providing an appliance data to a client, according to some embodiments.

FIG. 10 illustrates steps in a method 1000 for configuring, tracking, and providing an appliance data to a client, according to some embodiments. Method 1000 may be performed in connection with CTP system 100 (cf. FIG. 1). Accordingly, steps in method 1000 may be partially or entirely performed by a processor circuit in a CTP device by a client (e.g., processor circuit 714 in electronic device 700, cf. FIG. 7). The processor circuit may execute operations using commands and data stored in a memory circuit in the CTP device (e.g., memory circuit 702 in electronic device 700, cf. FIG. 7). The client may couple a client appliance to a service provider (e.g., client appliance 106 and service provider 102, cf. FIG. 1), to perform an operation on the client appliance. The client appliance may include a coding device that uniquely identifies the client appliance to the system in method 1000 (e.g., coding device 402 in battery 400, cf. FIG. 4). Some steps in method 1000 may be performed by the client after receiving a code decal sheet including a plurality of code decals for client appliances (e.g., code decals 501 in code decal sheet 500 (cf. FIG. 5). In some embodiments, method 1000 may include using a storage space for the client in a remote data storage, or a user account for the client in a network server (e.g., remote data storage 110, cf. FIG. 1, and client account 604 in network server 600, cf. FIG. 6). The remote data storage may include a memory circuit in the network server (e.g., memory circuit 602 in network server 600, cf. FIG. 6).

Step 1010 includes retrieving the appliance code from the appliance. For example, step 1010 may include using a camera configured for video capture or an NFC device and a reader from a CTP device 104. Step 1010 may include matching the appliance code in a list stored in the memory circuit and obtaining the appliance settings from a location in the memory circuit associated with the matched appliance code. In some embodiments, step 1010 includes transmitting the appliance code to the network server. Step 1020 includes retrieving configuration settings for the service provider, according to a reading of the appliance code. Accordingly, step 1020 may include retrieving the configuration settings from the memory circuit in the CTP device, or from the memory circuit in the network server. The configuration settings in step 1020 may be battery charger configuration settings, as described in detail above (e.g., configuration settings 700, cf. FIG. 8A). In some embodiments, the configuration settings in step 1020 may include display configuration settings for the service provider, such as described in detail above (e.g., display configuration settings 720, cf. FIG. 8B).

Step 1030 includes transmitting configuration settings to the service provider. Step 1030 may include transmitting the configuration settings to the service provider using a transmitter RF-antenna in the CTP device, and a receiver RF-antenna in the service provider. Step 1040 includes receiving tracking data from the service provider. The tracking data in step 1040 is related to the operation performed on the client appliance by the service provider. For example, the tracking data received in step 1040 may be battery charging data as described in detail above (e.g., charging data 800, cf. FIG. 8D). In some embodiments, step 1040 may also include displaying the tracking data for the client view. For example, step 1040 may include forming a graph with the tracking data and adding labels and features to the display of the CTP device (cf. FIG. 8D). In some embodiments, the tracking data in step 1040 may include error messages in a battery charging system, as described in detail above (cf. error messages 730, FIG. 8C).

Step 1050 includes analyzing the client appliance condition, based on the tracking data received in step 1040. Step 1060 includes issuing a warning for the client if it is determined in step 1050 that a safety condition or a performance standard has been compromised according to the analysis of the client appliance condition in step 1050. For example, step 1060 may include issuing an alert that the battery temperature is approaching a cut-off value (e.g., temperature cut-off 706, cf. FIG. 8A). Step 1070 includes storing the tracking data in local memory. Step 1070 may also include storing the alerts issued in step 1060 in the local memory. Step 1080 includes providing the tracking data to the network server. Accordingly, step 1080 may also include providing the issued alerts to the network server, for storage. Step 1090 includes analyzing the client appliance condition based on a collection of historical tracking data related to the client appliance, the historical tracking data stored in the network server. The result of the analysis may be stored in the network server, in a report associated with the client appliance. Thus, the client may have access to the report, or at least to portions of the report associated with the client appliance. For example, the result of the analysis may be stored in a report associated with a client account in the memory of the network server (e.g., reports 610, client account 604, and memory circuit 602 in network server 600, cf. FIG. 6). In some embodiments, the report stored in the network server may be accessible by a service provider vendor, for marketing analysis, for technical review of service performance, or for liability coverage.

It will be recognized by one of ordinary skill that a method for configuring, tracking, and providing an application data to a client such as method 1000 may include any one of steps 1010, 1020, 1030, 1040, 1050, 1060, 1070, 1080, and 1090 described above, performed in any order, or simultaneously in time. Furthermore, in some embodiments a method for configuring, tracking, and providing an appliance data to a client as described herein may include at least one or more of steps 1010, 1020, 1030, 1040, 1050, 1060, 1070, 1080, and 1090, described above.

Figure 11:
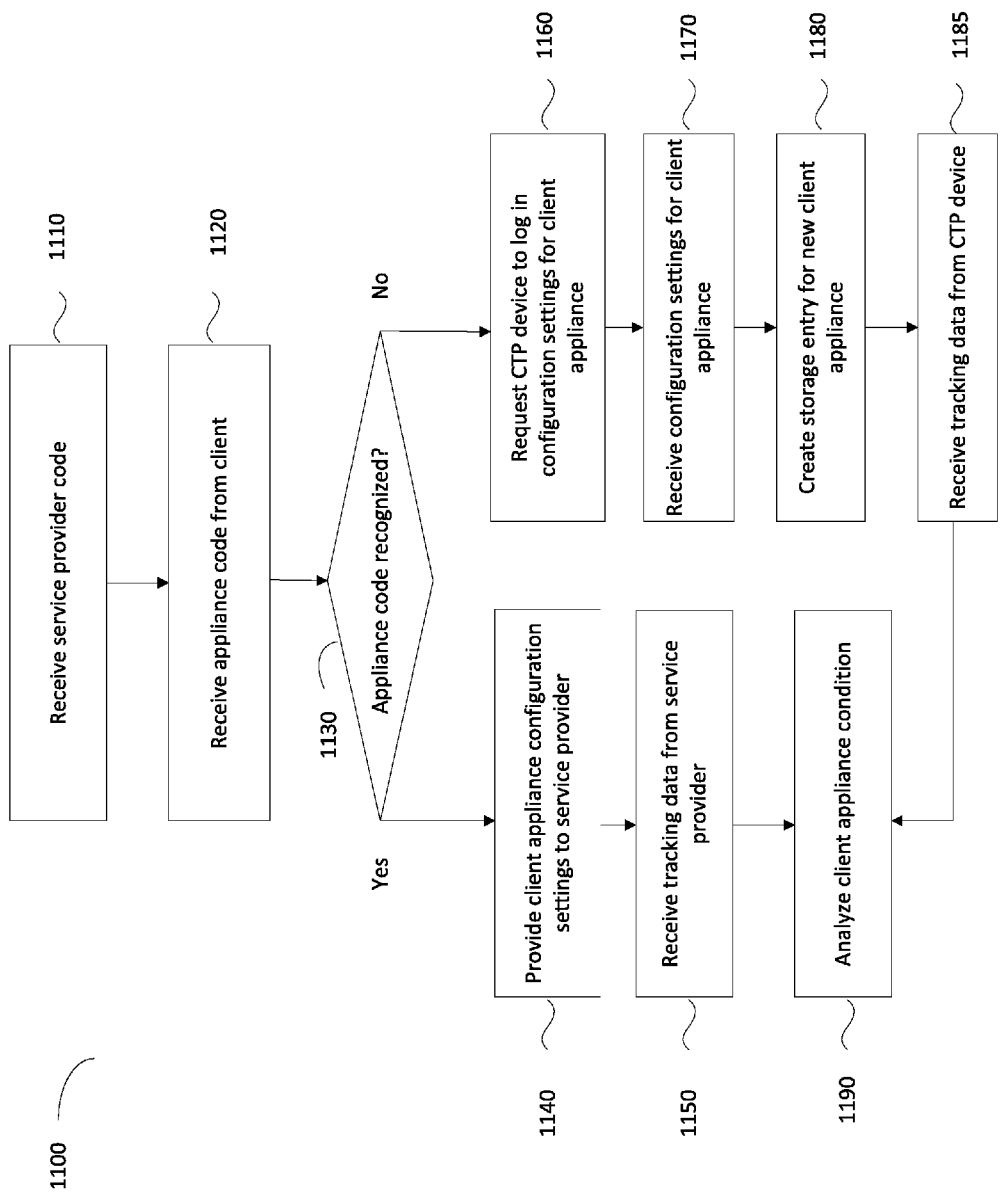
FIG. 11 illustrates steps in a method for configuring, tracking, and providing an appliance data to a client, according to some embodiments.

FIG. 11 illustrates steps in a method 1100 for configuring, tracking, and providing an appliance data to a client, according to some embodiments. Method 1100 may be performed in connection with CTP system 100 (cf. FIG. 1). Accordingly, steps in method 1100 may be partially or entirely performed by a processor circuit in a network server (e.g., processor circuit 614 in network server 600, cf. FIG. 6). The processor circuit may execute operations using commands and data stored in a memory circuit in the network server (e.g., memory circuit 602, cf. FIG. 6). The client may use a CTP device to communicate, transmit and receive commands and information to and from the network server (e.g., CTP device 104, cf. FIG. 1 and electronic device 700, cf. FIG. 7). The client may couple a client appliance to a service provider (e.g., service provider 102, and client appliance 106, cf. FIG. 1), to perform an operation on the client appliance. The client appliance may be a battery including a coding device to identify the client appliance to the system in method 1100 (e.g., coding device 402 in battery 400, cf. FIG. 4). Some steps in method 1100 may be performed by the client after receiving a code decal sheet including a plurality of code decals for client appliances (e.g., code decal sheet 500, cf. FIG. 5). In some embodiments, the system in method 1100 may include a storage space for the client in a remote data storage, or a user account for the client in a network server (e.g., remote data storage 110, cf. FIG. 1, and network server 600, cf. FIG. 6).

Step 1110 includes receiving the service provider code. Step 1120 includes receiving the appliance code from the client. Accordingly, step 1120 may include receiving the appliance code wirelessly through the CTP device. When the appliance code is recognized in step 1130, step 1140 includes providing to the service provider the configuration settings specific to the client appliance. The configuration settings in step 1140 may be battery charge and discharge configuration settings, as described in detail above (e.g., configuration settings 700, cf. FIG. 8A). In some embodiments, the configuration settings in step 1140 may include display configuration settings for the service provider, such as described in detail above (e.g., display configuration settings 720, cf. FIG. 8B). Step 1150 includes receiving tracking data from the service provider. The tracking data in step 11150 is related to the operation performed on the client appliance by the service provider. For example, the tracking data received in step 11150 may be as described in detail above (e.g., charging data 800, cf. FIG. 8D). In some embodiments, step 1150 may also include displaying the tracking data for the client view. For example, step 1150 may include forming a graph with the tracking data and add labels and features to the display of the CTP device. In some embodiments, the tracking data in step 1150 may include error messages in a battery charging system, as described in detail above (cf. error messages 730, FIG. 8C). When the appliance code is not recognized in step 1130, step 1160 includes requesting the CTP device to log in the configuration settings for the client appliance. Step 1170 includes receiving the configuration settings for the client appliance. Step 1180 includes creating the storage entry for the new client appliance. And step 1185 includes receiving tracking data from the CTP device. Step 1190 includes analyzing the client appliance condition. In that regard, step 1190 may include the steps and operations described in detail above with respect to step 1090 (cf. FIG. 10).

It will be recognized by one of ordinary skill that a method for configuring, tracking, and providing an application data to a client such as method 1100 may include any one of steps 1110, 1120, 1130, 1140, 1150, 1160, 1170, 1180, 1185, and 1190 described above, performed in any order, or simultaneously in time. Furthermore, in some embodiments method 1100 for configuring, tracking, and providing an appliance data to a client as described herein may include at least one or more of steps 1110, 1120, 1130, 1140, 1150, 1160, 1170, 1180, 1185 and 1190, described above.

Figure 12:
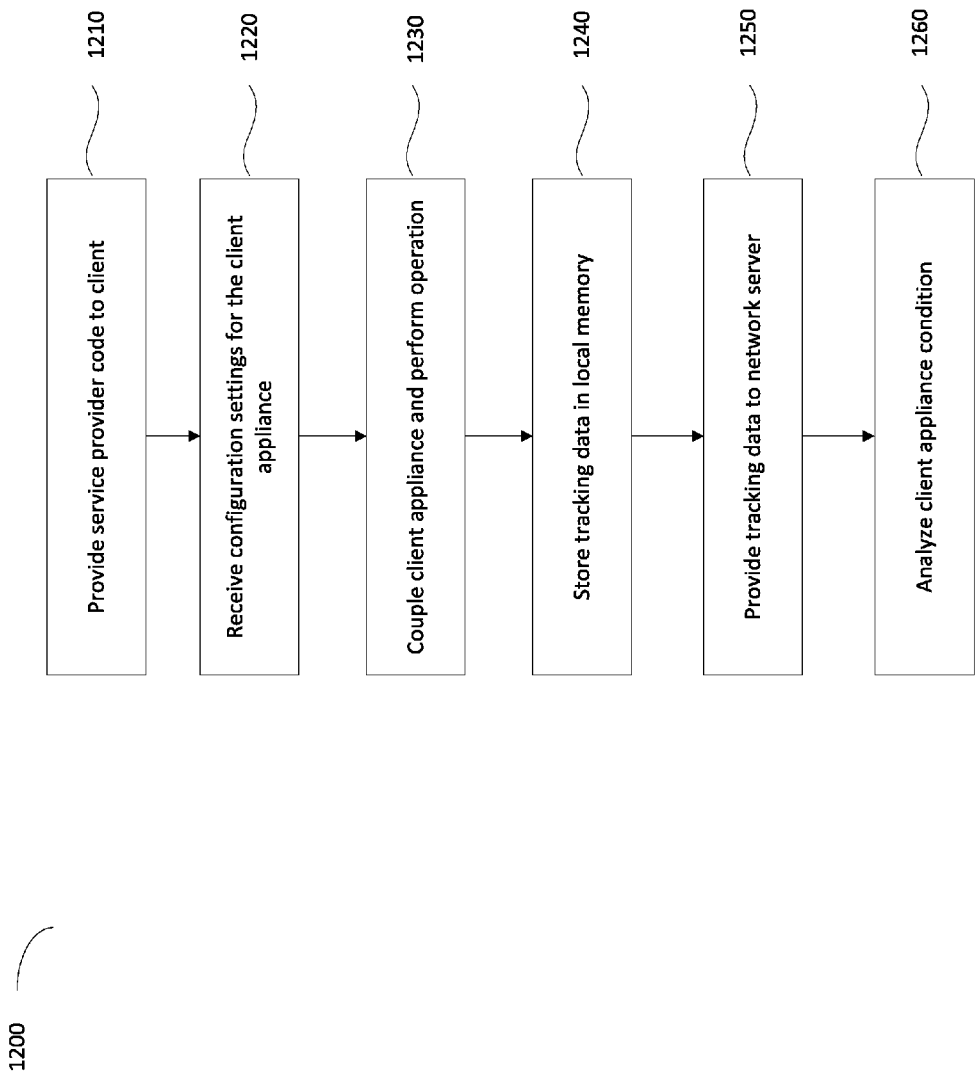
FIG. 12 illustrates steps in a method for configuring, tracking, and providing an appliance data to a client, according to some embodiments.

FIG. 12 illustrates steps in a method 1200 for configuring, tracking, and providing an appliance data to a client, according to some embodiments. Method 1200 may be performed in connection with CTP system 100 (cf. FIG. 1). Accordingly, steps in method 1200 may be partially or entirely performed by a processor circuit in a service provider (e.g., processor circuit 214 in battery charger 200, cf. FIG. 2). The processor circuit may be executing operations using commands and data stored in a memory circuit in the service provider (e.g., memory circuit 216 in battery charger 200, cf. FIG. 2). The service provider may be coupled to a client appliance (e.g., service provider 102, and client appliance 106, cf. FIG. 1), to perform an operation on the client appliance. The client appliance may include a coding device that identifies the client appliance to the system in method 1200 (e.g., coding device 402 in battery 400, cf. FIG. 4). Some steps in method 1200 may be performed by the client after receiving a code decal sheet including a plurality of code decals for client appliances (e.g., code decal sheet 500, cf. FIG. 5). In some embodiments, method 1200 may include using a storage space for the client in a remote data storage, or a user account for the client in a network server (e.g., remote data storage 110, cf. FIG. 1, and client account 604 in network server 600, cf. FIG. 6).

Step 1210 includes providing the service provider code to the client. Step 1220 includes receiving the configuration settings for the client appliance. The configuration settings in step 1220 may be battery charge and discharge configuration settings, as described in detail above (e.g., configuration settings 700, cf. FIG. 8A). In some embodiments, the configuration settings in step 1220 may include display configuration settings for the service provider, such as described in detail above (e.g., display configuration settings 720, cf. FIG. 8B).

Step 1230 includes performing the operation when the client appliance is coupled to the service provider. Accordingly, performing the operation may include charging the battery with the battery charger. Step 1240 includes storing tracking data in the local memory of the service provider. The tracking data in step 1240 is related to the operation performed on the client appliance by the service provider. For example, the tracking data stored in step 1240 may be battery charging data as described in detail above (e.g., charging data 800, cf. FIG. 8D). In some embodiments, storing tracking data in step 1240 may include storing error messages in a battery charging system, as described in detail above (cf. error messages 730, FIG. 8C). Step 1250 includes providing tracking data to the server. And step 1260 includes analyzing the client appliance condition. Step 1260 may also include issuing an alert when a client appliance condition compromises a safety parameter or a performance parameter.

It will be recognized by one of ordinary skill that a method for configuring, tracking, and providing an application data to a client such as method 1200 may include any one of steps 1210, 1220, 1230, 1240, 1250 and 1260 described above, performed in any order, or simultaneously in time. Furthermore, in some embodiments a method for configuring, tracking, and providing an appliance data to a client as described herein may include at least one or more of steps 1210, 1220, 1230, 1240, 1250 and 1260 described above.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A battery charger configured to charge a battery, the battery charger including a processor circuit and a memory circuit, and comprising:
   a radio-frequency (RF) antenna for wireless communication with an electronic device;
   an input panel;
   a plurality of sensors configured to collect tracking data from the battery charging;
   a local data storage configured to store tracking data for the battery charging, the local data storage adapted to store configuration settings to charge the battery; and
   a firmware stored in the memory circuit, the firmware having commands that when executed by the processor circuit cause the battery charger to store in the memory circuit the tracking data, wherein the firmware comprises commands to the processor circuit to transmit to the electronic device through the RF-antenna at least one of:
   the tracking data; and
   an alert associated with the battery charging, wherein the alert comprises an error message selected from the group consisting of an 'input voltage' error, an 'output battery connect' error, an 'output battery reverse polarity' error, an 'output battery open circuit' error, an 'output circuit' error, an 'output voltage too low' error, an 'output voltage too high' error, a 'temperature sensor' error, a 'battery temperature too low' error, a' battery temperature too high' error, an 'internal temperature too high' error, a 'balance voltage too high' error, a 'charger too hot' error, a 'sync command' error, and a 'flat check' error.

2. The battery charger of claim 1, wherein the firmware comprises commands to the processor circuit to receive from the electronic device through the RF-antenna a set of configuration settings associated with the battery.

3. The battery charger of claim 1, wherein the battery charger is configured to perform at least one of charging the battery, discharging the battery, and a combination of charging and discharging the battery.

4. The battery charger of claim 3, wherein the configuration settings include at least one of the group consisting of: a battery type; a battery voltage; a battery capacity; a temperature cut-off; a charge current; a safety timer; a terminal charge storage capacity; a terminal voltage capacity; a discharge current; and providing a discharge voltage.

5. The battery charger of claim 1, wherein the plurality of sensors comprises a plurality of terminals coupled to a plurality of battery cells included in the battery, the terminals configured to measure a battery cell voltage and to drain a battery cell current when the battery cell voltage is above a selected value.

6. The battery charger of claim 1, comprising a link port to couple the battery charger with a second battery charger, the second battery charger being controlled through a network cable coupled to the link port.

7. The battery charger of claim 1, comprising a plurality of power outputs, each power output configured to charge one of a plurality of batteries coupled to the power output.

8. A battery charger configured to charge a battery, the battery charger including a processor circuit and a memory circuit, and comprising:
   a radio-frequency (RF) antenna for wireless communication with an electronic device;
   an input panel;
   a plurality of sensors configured to collect tracking data from the battery charging;
   a local data storage configured to store tracking data for the battery charging, the local data storage adapted to store configuration settings to charge the battery;
   a firmware stored in the memory circuit, the firmware having commands that when executed by the processor circuit cause the battery charger to store in the memory circuit the tracking data; and
   a hardware code recognizable by the electronic device, the hardware code associated with a network account for a vendor that provides the battery charger.

9. A non-transitory computer readable medium storing commands that when executed by a processor circuit in a configure, track, and provide (CTP) device having a memory circuit and configured for use with a battery charger coupled to a battery, cause the CTP device to perform a method comprising:
   wirelessly coupling with a network server and with the battery charger;
   receiving a battery code from the battery;
   accessing a set of configuration settings for charging the battery using the battery code;
   providing the set of configuration settings to the battery charger; and
   receiving battery charging data from the battery charger, wherein the commands further cause the CTP device to analyze the battery charging data, and to issue an alert when a safety condition has been compromised.

10. The non-transitory computer readable medium of claim 9, wherein the commands further cause the CTP device to:
   receive the set of configuration settings from a client when the configuration settings are not stored in the memory circuit; and
   display the battery charging data.

11. The non-transitory computer readable medium of claim 9, wherein the commands further cause the CTP device to provide the battery charging data to the network server.

12. The non-transitory computer readable medium of claim 9, wherein the commands further cause the CTP device to receive the configuration settings from the server.

13. The non-transitory computer readable medium of claim 9, wherein the commands further cause the CTP device to provide the issued alert to the network server.

14. A non-transitory computer readable medium storing commands that when executed by a processor circuit in a configure, track, and provide (CTP) device having a memory circuit and configured for use with a battery charger coupled to a battery, cause the CTP device to perform a method comprising:
   wirelessly coupling with a network server and with the battery charger;
   receiving a battery code from the battery;
   accessing a set of configuration settings for charging the battery using the battery code;
   providing the set of configuration settings to the battery charger; and
   receiving battery charging data from the battery charger, wherein the commands further cause the CTP device to receive an updated firmware from the network server.

15. A non-transitory computer readable medium storing commands that when executed by a processor circuit in a network server cause the network server to perform a method comprising:
   receiving a service provider code associated with a service provider;
   receiving an appliance code associated with an appliance from a client;
   when the appliance code is recognized:
      providing a set of configuration settings for the appliance to the service provider, and
      receiving tracking data from a service provider associated with the service provider code;
   when the appliance code is not recognized: requesting a configure, track, and provide (CTP) device to log in the set of configuration settings for the client appliance; and
   analyzing a condition of the appliance.

16. The non-transitory computer readable medium of claim 15, wherein the commands further cause the network server to receive configuration settings for the appliance when the appliance code is not recognized.

17. The non-transitory computer readable medium of claim 15, wherein the commands further cause the network server to create a storage entry for the appliance when the appliance code is not recognized.

18. The non-transitory computer readable medium of claim 15, wherein the commands further cause the network server to receive tracking data from the CTP device when the appliance code is not recognized.

19. The non-transitory computer readable medium of claim 15, wherein the commands further cause the network server to store a report for the appliance, the report based on the analyzing the condition of the appliance.

20. The non-transitory computer readable medium of claim 16, wherein the commands further cause the network server to issue an alert when the condition of the appliance indicates that a performance standard has been compromised.

21. The non-transitory computer readable medium of claim 20, wherein to issue an alert includes to issue an error message selected from the group consisting of an 'input voltage' error, an 'output battery connect' error, an 'output battery reverse polarity' error, an 'output battery open circuit' error, an 'output circuit' error, an 'output voltage too low' error, an 'output voltage too high' error, a 'temperature sensor' error, a 'battery temperature too low' error, a' battery temperature too high' error, an 'internal temperature too high' error, a 'balance voltage too high' error, a 'charger too hot' error, a 'sync command' error, and a 'flat check' error.

22. The non-transitory computer readable medium of claim 19, wherein the method further comprises providing at least a portion of the report to a vendor that supplies the service provider.

23. The non-transitory computer readable medium of claim 19, wherein the method further comprises providing at least a portion of the report to a vendor that supplies the appliance.

24. The non-transitory computer readable medium of claim 16, wherein the method further comprises providing an updated firmware used by the service provider.

* * * * *